L. S. BURRIDGE.
ADDING AND RECORDING MACHINE.
APPLICATION FILED APR. 5, 1913.
1,198,820.
Patented Sept. 19, 1916.
4 SHEETS—SHEET 1.
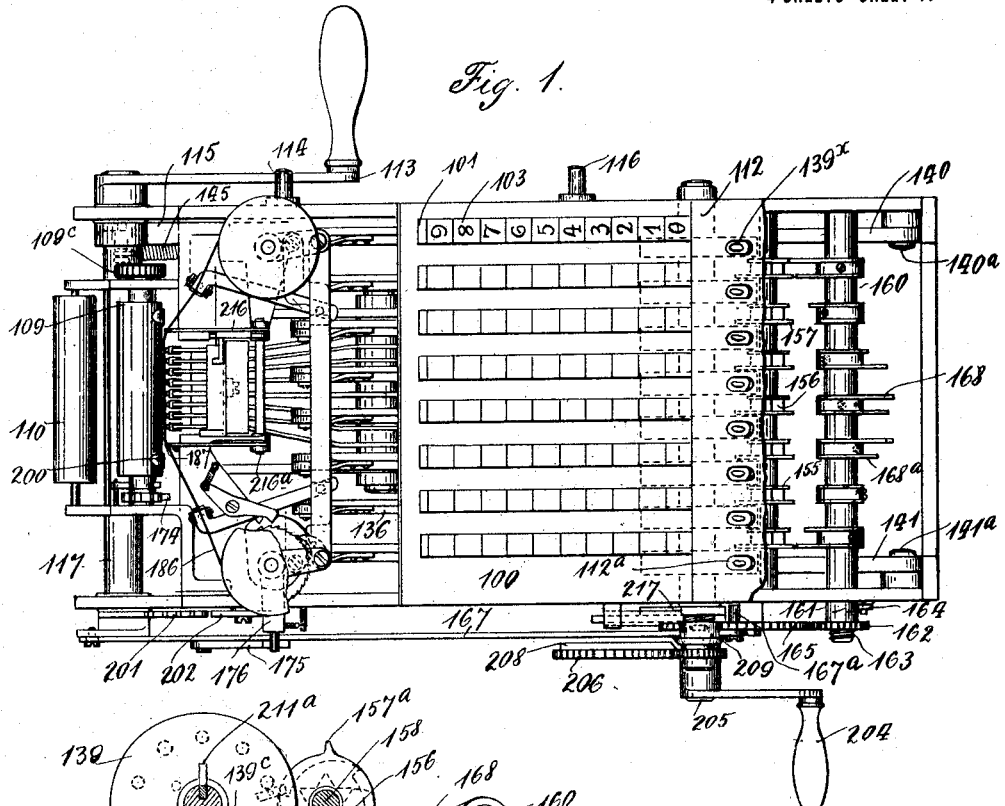
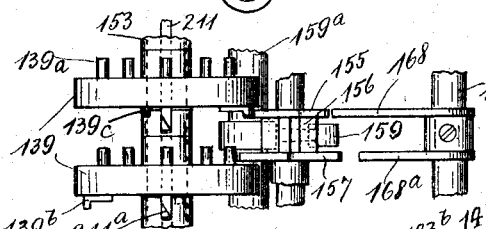
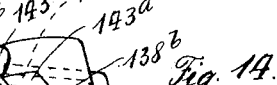
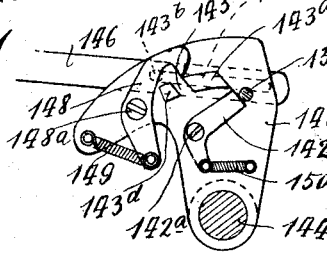
WITNESSES:
INVENTOR L. S. BURRIDGE.
ADDING AND RECORDING MACHINE.
APPLICATION FILED APR. 5, 1913.
1,198,820.
Patented Sept. 19, 1916.
4 SHEETS—SHEET 2.
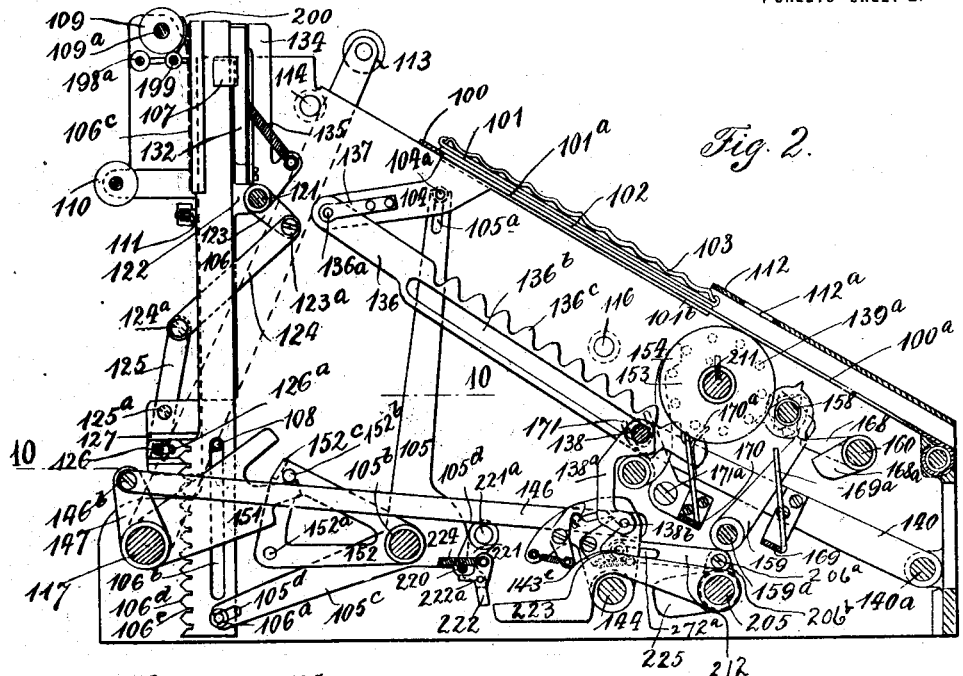
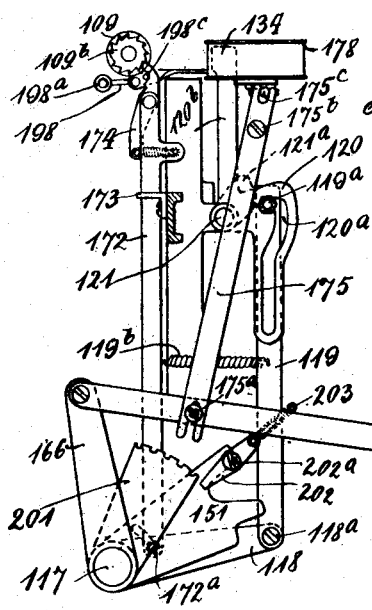
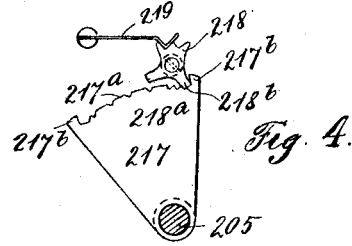
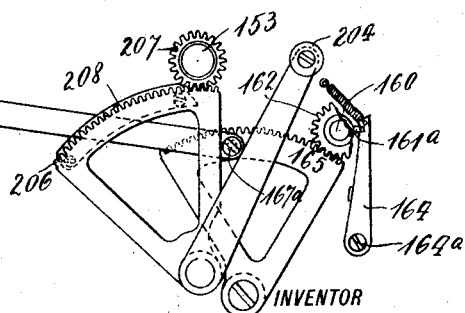
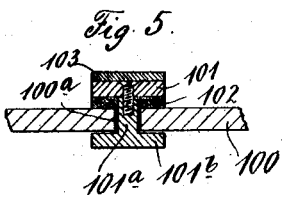
WITNESSES:
INVENTOR
Lee S. Burridge L. S. BURRIDGE.
ADDING AND RECORDING MACHINE.
APPLICATION FILED APR. 5, 1913.
1,198,820.
Patented Sept. 19, 1916.
4 SHEETS—SHEET 3.
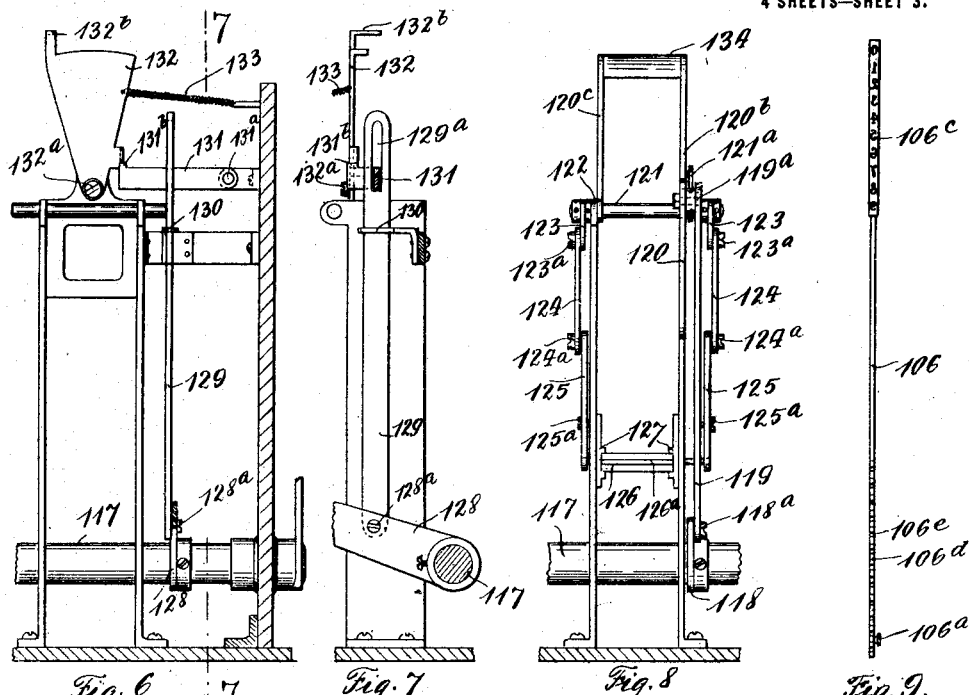
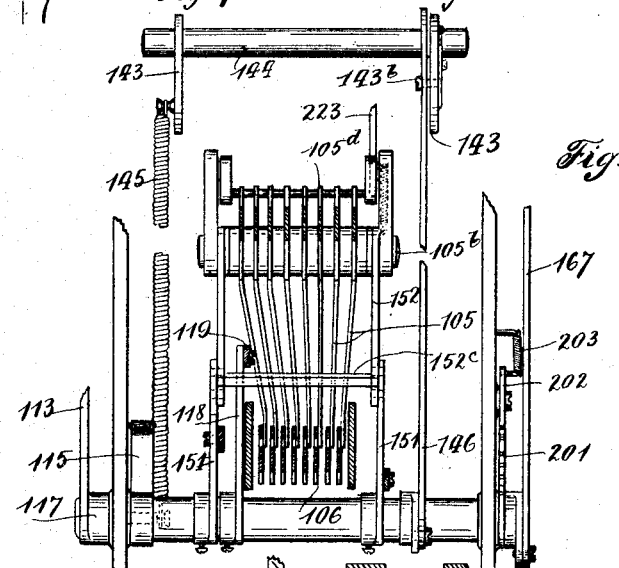
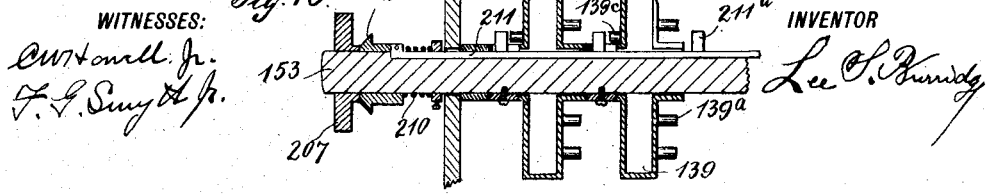

UNITED STATES PATENT OFFICE.

LEE S. BURRIDGE, OF NEW YORK, N. Y.; FRANCIS O. BURRIDGE EXECUTOR OF SAID LEE S. BURRIDGE, DECEASED.

ADDING AND RECORDING MACHINE.

1,198,820.  Specification of Letters Patent.  Patented Sept. 19, 1916.

Application filed April 5, 1913. Serial No. 759,231.

*To all whom it may concern:*

Be it known that I, LEE S. BURRIDGE, a citizen of the United States, and a resident of the borough of Manhattan, city, county, and State of New York, have invented certain new and useful Improvements in Adding and Recording Machines, of which the following is a specification.

My invention relates to machines for performing addition and recording the results of the operation, and has particular reference to adding machines in which the numbers or items to be added are "set up" by means of slides bearing a series of figures or digits, as distinguished from keys each of which bears a single figure.

The objects of my invention are to simplify the construction of the machine, to render the operation certain and easily learned, and also, in the preferred form of my invention, to provide means whereby if desired partial results or "subtotals" may be recorded or printed at any intermediate stage of the operation, without setting the machine to zero until the final total is recorded.

A particular embodiment of my invention will now be explained, as an example, with reference to the accompanying drawings, and the features of novelty will then be pointed out in the appended claims.

Figure 15:
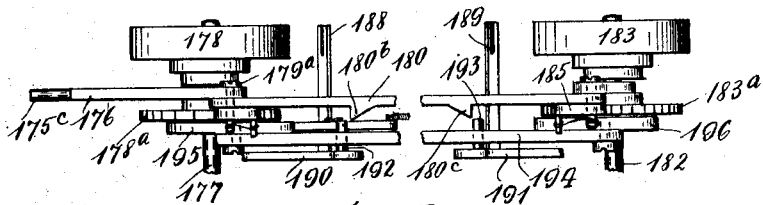
Figure 16:
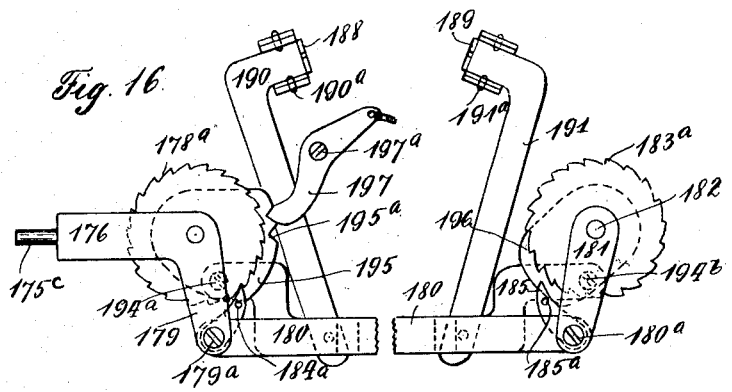
Figure 17:
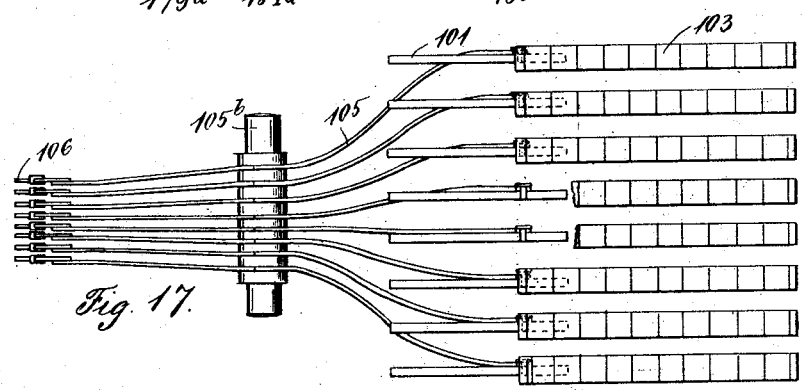
Figure 18:
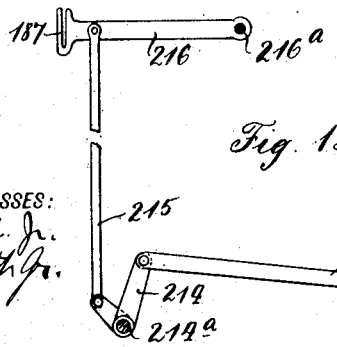

Figure 1 is a plan view of the machine; Fig. 2 is a side elevation of the machine, with one of the side plates of the machine omitted so as to better show the parts within the frame; Fig. 3 is a side elevation showing chiefly the printing mechanism and some of its connections; Fig. 4 is a detail side elevation of the mechanism for locking the zero and total setting handle; Fig. 5 is a cross section of one of the key bars and its supporting board; Fig. 6 is a front elevation of the shutter mechanism working in conjunction with the type bars; Fig. 7 is a vertical section on line 7—7 of Fig. 6; Fig. 8 is a front elevation of the hammer mechanism working in conjunction with the shutter for effecting the impression; Fig. 9 is a rear elevation of one of the type bars; Fig. 10 is a partial horizontal section, taken on line 10—10 of Fig. 2; Fig. 11 is a top view of two adding wheels, with one of the carrying wheels and their operating mechanism; Figs. 12 and 13 are side views corresponding to Fig. 11, with the parts in two different positions; Fig. 14 is a detail side view of a sector operating a universal bar; Fig. 15 is a front elevation of the mechanism for feeding and reversing the ribbon; Fig. 16 is a corresponding top view, with the ribbon spools omitted; Fig. 17 is a diagrammatic plan view of the key bars, type bars, and the levers connecting them; Fig. 18 is a diagrammatic side elevation of the means for shifting the ribbon so as to print in one or the other of two different colors; and Fig. 19 is a partial longitudinal section through the shaft carrying the adding wheels, with the adjacent parts.

The frame of the machine has a top or supporting board 100 inclined forward and downward and provided with parallel slots 100$^a$ extending from front to rear. In these slots are received the stems or shanks 101$^a$ of sliding key bars 101, provided with feet or bases 101$^b$ working under the top or board 100, while the body of each key bar is above the said board. Preferably, a strip of felt or other suitable soft material is interposed between the upper surface of the board 100 and the adjacent faces of the key bars, as by securing such a strip 102 to the under surface of each key bar body. This felt will assist by friction in preventing any accidental movement of the key bars. Each key bar carries a number plate 103, formed with depressions as shown best in Fig. 2, so as to be engaged readily by the operator's fingers. This plate (rigid with the key bar) may be made of celluloid, and is numbered in each depression, from 0 to 9, the zero being at the lower or forward end, see Fig. 1. Each key bar has an arm 104 extended downwardly and provided with a transverse pin 104$^a$ projecting through a longitudinal slot 105$^a$ in the longer arm of a lever 105 fulcrumed at 105$^b$ on the frame of the machine. The shorter, rearwardly extending lower arm 105$^c$ of the lever 105 has a longitudinal slot 105$^d$ into which projects a pin 106$^a$ carried by a type bar 106, mounted to slide vertically along a fixed guide 107 (which has the shape of a toothed bar or comb, see Fig. 1, the several type bars sliding in the respective notches of said guide). A stationary pin 108 extends through the longitudinal slots 106$^b$ of all the type bars, and assists in guiding the type bars, yet allows them to swing on said pin as a pivot in a transverse direction, so that the type bars may move slightly rearward (away from the bottoms of the notches in the guide bar 107) so that the type 106ᶜ provided on the rear side of each type bar may be moved toward a platen 109, journaled at 109ᵃ. Paper is supplied to the platen in any suitable manner, as from a roll 110. Each type bar carries ten number or digit types arranged consecutively, from 0 to 9, with the zero at the upper end of the type bar, that is to say, the arrangement of numbers or digits is the reverse on the type bars from the arrangement on the key bars. The type bars are normally held away from the platen by a spring-pressed bar 111, which yields when the type bars are thrown toward the platen by mechanism to be described hereinafter.

It will be understood that the connection between the key bars and the corresponding type bars is such that when a key bar 101 is moved down from the normal position shown in Fig. 1, the corresponding type bar 106 will be raised to bring that type 106ᶜ into operative position (into the printing line) which agrees with the figure or number of the plate 103 appearing immediately above a frame plate 112 under which the key bars 101 disappear when moved down. The upper edge of this plate 112 forms a stop for the operator's finger when moving the key bar downward. The divisions or spaces of the number plates 103, that is to say, the spaces allotted to each of the figures or digits, are smaller than the divisions of the type bars 106, that is the spaces allotted to each of the digits or types 106ᶜ. Thus the types 106ᶜ may be brought close together, and the throw or travel of each type bar reduced, while the spaces of the number plates 103 are of the proper width to insure easy manipulation. The provision of the levers 105, having arms of different length, as a means for transmitting motion from the key bars to the corresponding type bars, secures the proper reduction in the extent of the movement; the pin-and-slot connection employed at each end of the levers 105 secures the advantage of a uniform transmission of movement from a key bar to its type bar, notwithstanding the changing leverage of the connecting pins; thus both the types 106ᶜ and the numbers on the plates 103 may be spaced evenly. In the normal position (Fig. 1) the figure or digit 0 of each key bar appears immediately above the upper edge of the stop plate 112, and all the types 106ᶜ bearing the figure 0 are in the printing line; if one of the key bars 101 is moved down, say to a position where the figure 4 appears immediately above the upper edge of the plate 112, the corresponding type bar 106 is raised to bring its "4" type into the printing line.

As long as no other part of the machine is operated, the key bars 101 may be moved freely (and independently of each other) downward from the normal position and upward from any other position. It will be understood that the first operation in the use of the machine, is to form the first number or item to be added, by shifting the key bars 101 until the figures showing immediately above the upper edge of the plate 112 indicate such item. If any error has been made (say by moving one of the key bars to "3" instead of "2"), this can be corrected at once and readily by moving the respective key bar to the desired position, without first returning it to its original or normal position. The upward and downward movement of each key bar is limited in any suitable manner, as by the ends of the corresponding slot 100ᵃ.

At the right hand portion of the machine is located the main operating handle 113 which controls the printing mechanism and other devices as will be described presently. This handle is returned to its normal (upper or rear) position, against a stop 114, by a coiled spring 115; another stop, 116, limits the forward and downward movement of the handle.

On the rock shaft 117 carrying the handle 113 is secured rigidly an arm 118, pivotally connected at 118ᵃ, with a link 119, the upper end of which carries a pin 119ᵃ projecting into a slot 120ᵃ of an arm 120 rigidly secured to a rock shaft 121. The link 119 is pulled rearward by a spring 119ᵇ. The shaft 121 is journaled in a bracket 122 which may be integral with the type bar guide 107. On the rock shaft 121 are secured rigidly two arms 123 pivotally connected at 123ᵃ with links 124 the lower ends of which are pivoted at 124ᵃ to levers 125 fulcrumed at 125ᵃ on a fixed part of the machine. The lower ends of the levers 125 have a pin-and-slot connection with a locking slide 126 movable forward and rearward along fixed guides 127 and adapted to move into engagement with a toothed portion or rack 106ᵈ formed on the rear side of each type bar 106, at its lower portion.

Normally, the locking slide 126 is clear of the racks 106ᵈ, so that the type bars 106 may be moved freely by the sliding of the key bars 101. As soon however as the handle 113 is moved slightly forward, the link 119, by means of its pin 119ᵃ working at first in the horizontal upper end of the slot 120ᵃ, will swing the rock shaft 121 in such a way as to carry the locking slide 126 forward, to lock all the type bars 106 in whatever position they may have at the time.

On the shaft 117 is secured another arm 128, having a pin-and-slot connection 128ᵃ with an upwardly extending link 129, which is held against lateral motion by a forked or slotted fixed guide 130, while above said guide the link has a longitudinal slot 129ᵃ through which extends an approximately horizontal arm 131 ranging transversely of the machine and mounted to swing about a horizontal pivot 131$^a$ extending in the direction from front to rear. The arm 131 normally rests on the link 129, at the lower end of the slot 129$^a$. The free end of the arm 131 is formed with a stop 131$^b$ which in the position of rest holds a shutter 132 in such a position that it will be immediately in front of those portions of the type bars 106 which are at the printing level, or at least approximately at the same level with these portions of the type bars. This shutter is pivoted to the frame of the machine at 132$^a$ so as to swing in a transverse plane, and is drawn against the stop 131$^b$ by a spring 133. The shutter has a projection or finger 132$^b$ at a level above the upper ends of the type bars 106 when the latter are in their normal (lower) position. If however any one of the type bars is raised by shifting the corresponding key bar 101 as described above, the upper end of this type bar will project into the path of the finger 132$^b$ carried by the shutter 132. When the handle 113 is moved forward and the link 129 pulled down, gravity, assisted by the push of the spring-pressed shutter 132 against the stop 131$^b$, will cause the arm 131 to swing downward on its pivot 131$^a$, the spring 133 at the same time causing the shutter to swing on its fulcrum 132$^a$ until the shutter is arrested by the engagement of the finger 132$^b$ with the raised type bar 106. If two or more type bars are in the raised position, the shutter will be arrested by the raised bar which is farthest to the left. Thus the shutter will remain in front of all the type bars at the right hand side of the machine, beginning with the raised type bar which is farthest to the left; the shutter however will not be in front of the other type bars (to the left of the raised type bar corresponding to the highest denomination).

The arm 120 is extended upwardly at 120$^b$ to carry a striker or hammer 134, which is supported at the other end by a similar arm 120$^c$ secured rigidly to the rock shaft 121. The hammer 134 is pulled rearward (toward the platen 109) by a spring 135 attached to a fixed point and, for instance, to the arm 120$^c$.

When upon swinging the handle 113 forward the pin 119$^a$ is brought to the vertical or upright portion of the slot 120$^a$, by the action of a cam 121$^a$ secured rigidly to the rock shaft 121, the arm 120 and all the parts connected therewith, including the hammer 134, are released and free to swing under the influence of the spring 135, it being understood that the cam 121$^a$ positively disengages the pin 119$^a$ from the horizontal portion of the slot 120$^a$. When released as just described, the hammer 134 will swing rearward and will strike a sharp blow against the shutter 132, forcing the latter and those type bars 106 which are engaged by it, rearward so as to secure an impression of the digits or figures which are at the printing level. The figures on those type bars which are out of contact with the shutter at the time will however not be printed, even though they be at the printing level, because the hammer blow will not be exerted against these type bars, but only upon those temporarily in engagement with the shutter 132.

It will be seen that after the handle 113 has begun to move forward, and until the hammer 134 is released to effect an impression as described, the type bars 106 and the key bars 101 connected with them positively, are locked by the slide 126. The meeting portions of the slide 126 and of the racks 106$^d$ are beveled so that the slide 126 in moving to the locking position will also properly aline all the type bars. In advance of its beveled portion, the slide 126 has a portion or rib 126$^a$ provided with horizontal top and bottom surfaces, and the racks 106$^d$ are formed with corresponding slots 106$^e$ at the bottom of their bevels. The type bars are thus locked positively against vertical movement notwithstanding vibrations, as soon as the rib 126$^a$ enters the slots 106$^e$, and the locking is not dependent on the slide's taking an exact position, as long as said rib 126$^a$ enters the slots 106$^e$. When the hammer 134 delivers its impression blow, the locking slide 126 moves away from the type bars, so that the latter and the key bars 101 are again free. During the return movement of the shaft 117, the link 129 will raise the arm 131 and thus press the shutter back to its original position.

The movement of the shutter 132 under the influence of the spring 135 is limited, as above described, by the engagement of the finger 132$^b$ with a raised type bar. A fixed stop 132$^c$ may also be provided in the path of the finger 132$^b$ to prevent the shutter from ever swinging clear of all the type bars. Thus even if no type bar is raised, the hammer 134 will find the shutter in a position in which it engages a sufficient number of type bars to prevent the blow from having a destructive effect on the type bars. It will be understood that the shutter 132 is mounted on its pivot 132$^a$ with sufficient looseness to allow the shutter to yield rearward under the impact of the hammer at the time of the impression.

The arm 104 of each key bar 101 is connected pivotally at 136$^a$ with a rack bar 136, the connection being preferably a detachable one, for which purpose the connecting pin 136$^a$, permanently secured to the rack bar 136, may be engaged by a spring arm 137 permanently attached to the arm 104. By bending the spring arm 137 laterally, it will be disengaged from the pin 136ª. The lower portions of the rack bars are mounted to swing and to slide on a suitable support or universal bar 138, extending through the longitudinal slots 136ᵇ of the several rack bars. The teeth 136ᶜ of the rack bars 136 are adapted (under certain conditions to be set forth presently) to engage the teeth or pins 139ª of number wheels or registering wheels 139 provided with numbers 139ˣ adapted to show through windows 112ª of the plate 112. Normally however the universal bar 138 is in its lower position (Fig. 2), so that the rack bars 136 will slide forward and rearward freely without operating the number wheels 139. The universal bar 138 is secured rigidly to two arms 140, 141 fulcrumed on the frame of the machine, as indicated at 140ª, 141ª, and to each end of the universal bar is secured rigidly an extension 138ª provided with a transverse pin 138ᵇ. In the normal or initial position, this pin 138ᵇ engages the inclined end of a pawl 142 fulcrumed at 142ª upon a sector 143 mounted rigidly on a rock shaft 144 which a spring 145 tends to return to its normal rear position. Each sector 143 is provided with a cam 143ª one end of which normally alines with the corresponding end of the pawl 142. Each sector has a transverse pin 143ᵇ projecting into a longitudinal slot 146ª of a link 146 extending rearwardly, the rear end of said link being pivotally connected at 146ᵇ with a crank arm 147 on the rock shaft 117. Normally, the pin 143ᵇ is at the rear end of the slot 146ª. Thus when the handle 113 is pulled down, rocking the sectors 143 forward, each pin 138ᵇ will ride up the alined inclined surfaces of the corresponding pawl 142 and cam 143ª, thereby raising the universal bar 138 and all the rack bars 136 to bring the rack teeth 136ᶜ into operative relation to the number wheels or registering wheels 139. This position is maintained during the further forward movement of the sectors 143, as long as the pins 138ᵇ ride on the outer surfaces of the cams 143ª, which surfaces are concentric with the shaft 144. When the pins 138ᵇ clear the rear ends of the cams 143ª, they drop through a slot 143ᶜ on to a stop 143ᵈ rigid with the cam sector 143 and located substantially in the continuation of the respective cam 143ª. This drop of the universal bar toward the end of the forward movement of the handle 113 is very slight and not sufficient to disengage the rack bars 136 from the registering wheels 139. As the pins 138ᵇ clear the rear ends of the cams 143ª, these pins are prevented from returning through the same path, by the action of hook-shaped pawls 148, each pivoted to its sector at 148ª and urged forward by a spring 149 attached to the sector. During the return movement of the handle 113, the sectors 143 swing rearward, the pins 138ᵇ drop from the stops 143ᵈ upon the upper surfaces of the pawls 142 pivoted to the sectors 143 at 142ª and pressed upward by springs 150 attached to the sectors. As the forward movement of the handle 113 and of the sectors 143 continues, the pins 138ᵇ pass between the lower surfaces of the cams 143ª and the pawls 142, forcing said pawls away from the respective cams against the tension of the springs 150. When the pins 138ᵇ clear the forward ends of the pawls 142, the latter spring back to their original positions (Fig. 14).

During the time that the rack teeth 136ᶜ are in operative engagement with the registering wheels 139, as just described (the pins 138ᵇ being in engagement either with the outer surfaces of the cams 143ª or with the stops 143ᵈ, as the handle 113 and the sectors 143 move forward), the registering wheels 139 are rotated owing to the rack bars 136 being returned (slid rearward or upward) to their original positions by the following mechanism: On the rock shaft 117 are secured rigidly two arms 151, the forked ends of which are adapted to engage pins 152ª and 152ᵇ after the shaft has been rocked forward a certain distance. These pins are projected from the end members of a return bail 152 mounted to swing about the same fulcrum 105ᵇ as the levers 105. The central cross bar 152ᶜ of this bail extends across the rear ends of the levers 105. When any one of the key bars 101 is moved forward (downward), the corresponding lever end 105ᶜ is raised. During the forward movement of the handle 113, the bail member 152ᶜ, being swung downward by the successive engagement of the arms 151 with the pins 152ª and 152ᵇ, will force down to its original position, any lever end 105ᶜ that happens to be raised. The pins 152ª will be engaged first, and when an angle is reached at which these pins would work at a disadvantage, they swing out of contact and the pins 152ᵇ take up the task of receiving the push of the arms 151, which thus always exert their pressure in the neighborhood of the plane passing through the shaft 117 and the fulcrum 105ᵇ. As the levers 105 are restored to their original positions by the action of the arms 151 and pins 152ª and 152ᵇ, the corresponding type bars 106, key bars 101, and rack bars 136 will of course be returned to their initial positions at the same time. This return movement takes place at the time when the universal bar is in its upper position, that is to say, during part of the forward movement of the handle 113. The number wheels or registering wheels 139 will therefore be rotated by the rack bars 136 belonging to key bars 101 which had previously been moved from their original positions. According to the greater or smaller extent to which the key bars 101 and rack bars 136 had been moved, the return movement will be greater or smaller, and the adding or registering wheels 139 will be rotated correspondingly. It will be understood, of course, that the number spaces or divisions of the plates 103 will agree in width with the rack teeth 136ᶜ, and that each of the wheels 139 has ten teeth or pins 139ᵃ and bears on its periphery ten consecutive number indications (0 to 9). While the key bars 101 are set at such distances apart as will allow them to be operated conveniently by the user's fingers, the type bars 106 are set together much more closely, corresponding (more or less) to the letter spacing customary in typewriting.

Each wheel 139 is mounted to turn freely, under normal conditions, upon a shaft 153, and for each wheel I provide a spring-pressed holding or centering pawl 154, beveled in both directions and engaging two adjacent pins 139ᵃ, so as to keep the corresponding wheel in the proper position and prevent its accidental turning, while allowing it to turn in one direction under the influence of the mechanism described above, and in the opposite direction under the influence of the combined zero and total setting device to be described below.

The "carrying" device is constructed as follows: Each adding wheel 139 has a single or "tens" pin 139ᵇ, shown on the side of the wheel opposite to that carrying the pins 139ᵃ. This "tens" pin is adapted to engage one of several (three) teeth 155ᵃ of a disk 155 connected rigidly, by a toothed sleeve 156, with another disk 157 having a like number (three) of teeth 157ᵃ adapted to engage the pins 139ᵃ of the adjoining number wheel or adding wheel 139. The toothed disks 155, 157 with their connecting toothed sleeve 156 form a carrying wheel.

It will be understood that the two disks of the same carrying wheel are adapted to engage respectively, the "tens" pin 139ᵇ of one adding wheel 139 and the pins 139ᵃ of the adding wheel of the next higher denomination. All the carrying wheels are mounted, independently of one another, upon an axle 158 parallel with the shaft 153. Each sleeve 156 has its teeth engaged by a centering pawl or detent 159 fulcrumed at 159ᵃ, such pawls preventing the accidental rotation of the respective carrying wheels, but allowing them to turn in one direction for the "carrying" operation. The pawls 159 also keep the teeth 155ᵃ and 157ᵃ in the proper positions. When a "tens" pin 139ᵇ turns the corresponding carrying wheel, one tooth 157ᵃ of said wheel is brought close to (but not in actual engagement with) one of the teeth 139ᵃ of the corresponding adding wheel 139, but this latter is not yet advanced one tooth or division. In other words, when one of the adding wheels 139 reaches the "carrying" position in which the adjoining wheel 139 is to be advanced one division (Fig. 12), the adding wheel of lower denomination does not operate to move ("carry") the adding wheel of the next higher denomination, but only sets the corresponding carrying wheel to its active position, as shown in Fig. 13. A separate device is employed for giving the carrying impulse. This device for operating the carrying wheels comprises a shaft 160 which is rotated in one direction only, during the return movement of the handle 113. For this purpose, a collar 161 provided with clutch teeth is secured rigidly to said shaft, while the other member of the clutch is formed by the correspondingly toothed hub of a pinion 162 capable of turning on the shaft and also of sliding lengthwise thereof, and pressed toward the clutch collar 161 by a spring 163. A spring-pressed locking detent 164, fulcrumed at 164ᵃ, is adapted to engage a projection 161ᵃ on the clutch collar 161, to hold the shaft 160 in its normal position. The pinion 162 is in mesh with a toothed sector 165 fulcrumed at 165ᵃ and operated from the rock shaft 117 by means of a crank arm 166 and a link 167. When the handle 113 is pulled forward, the pinion 162 is turned in such a direction as to cause the clutch teeth to slip over each other, without rotating the collar 161 and the shaft 160, the spring 163 yielding to allow the necessary lateral movement of the pinion 162, and the detent 164 holding the shaft 160 against rotation. Toward the end of the forward movement of the handle 113, a pin or projection on the sector 165 (this may be the same pin 167ᵃ which serves to connect the link 167 with said sector), will engage the locking detent 164 and swing it out of engagement with the projection 161ᵃ. During the return movement of the handle 113, the clutch is operative to turn the shaft 160 in unison with the pinion 162. To the shaft 160 are secured rigidly a number of arms 168, each located in the same plane as one of the toothed disks 155 of one of the carrying wheels. Unless however a carrying wheel has been "set" as described above, by the action of a "tens" pin 139ᵇ on a tooth 155ᵃ, the disk 155 stands in such a position (Fig. 12) that the corresponding arm 168 will swing by it without coming against any one of the teeth 155ᵃ, that is to say, without operating the carrying wheel. When a carrying wheel has been set (Fig. 13), one of the teeth 155ᵃ is in the path of the corresponding arm 168, so that upon the rotation of the shaft 160 the carrying wheel will be given a partial rotation, that tooth 157ᵃ of said wheel which is close to a tooth 139ᵃ of the respective adding wheel 139, advancing said adding wheel one division. Inasmuch as the carrying operation, in the natural sequence of addition, occurs successively, beginning with the lowest denomination, it is desirable to have the several arms 168 act successively on the respective carrying wheels, beginning with the lowest denomination and passing on progressively to the higher denominations. This also presents the advantage of avoiding the unusual resistance which would be opposed to the operation of the mechanism if it should happen that two or more adding wheels 139 were to be "carried" at the same time. Therefore, in order to obtain the successive carrying action of the several arms 168, I prefer to give them a staggered arrangement, as shown in Fig. 1. If for instance there are eight arms 168 and the shaft 160 performs a complete revolution at each operation, the arms 168 would be set in positions at 45° from each other. Thus the carrying operation would be performed only on one adding wheel at a time, yet during one operation of the shaft 160 (return movement of the handle 113,) all the carrying wheels that happen to be in the active position, will be operated to advance the corresponding adding wheels 139. If several wheels 139, or all of them, happen to be at "9" at the time of such carrying operation, the carrying of one will "set" and carry the next, which is necessarily successive and cannot be performed at the same time.

In order to prevent the arms 168 from throwing the carrying wheels too far, in case the shaft 160 is turned rapidly, I provide, at a definite distance in the rear of each arm 168, a following arm 168$^a$ arranged to come in front of a tooth 157$^a$ of the same carrying wheel which such arm 168 operates. I thus check any tendency of the carrying wheel to move beyond the throw it receives from the arm 168. The disks 155 and 157, or rather the pitch circles of their teeth 155$^a$ and 157$^a$, are made of different diameters, the pitch circle of the teeth 155$^a$ being smaller than the pitch circle of the teeth 157$^a$. Thus, while the arms 168 act on the teeth having the smaller pitch circle, they impart a movement of greater peripheral or linear extent to the teeth 157$^a$ so as to give the requisite turning movement to the adding wheels 139. The difficulty of this part of the problem will be understood upon considering that, with the construction shown, the adding wheels 139 are to be turned through an angle of 36° at each operation, while the operative stroke of each arm 168 is only about 45° in angular extent. Each carrying wheel has three teeth 155$^a$ and three teeth 157$^a$, as has been stated above, and the teeth 155$^a$ stand (measuring the angles) between the teeth 157$^a$, although it is not essential that they should stand exactly midway. Each of the sleeves 156 has as many (evenly spaced) teeth as the disks 155 and 157 have together, that is to say six, in the example illustrated. The connecting faces or backs of the teeth 155$^a$ are given the cam shape shown best in Figs. 12 and 13, the object of this being twofold: First, these surfaces will then form stops for arresting a rearward movement of the "tens" pins 139$^b$ when the carrying wheels are in the normal position. Second, if an adding wheel 139 should be at "9" and is then turned 9, the carrying wheel being set (and operated), and the wheel 139 is then at "8" and may have been carried to "9" before the carrying wheel has been reset to have a tooth 155$^a$ on the farther side of a "tens" pin 139$^b$. The angular or cam face of the teeth 155$^a$ enables them to pass by the pins 139$^b$ in such event slightly dislodging the adding wheel but permitting the carrying wheel to reach its proper position.

The carrying wheels are positively limited in their turning movement, while the universal bar 138 is in its raised position, by means of projections 169$^a$ secured to a cross bar 169 the ends of which are fastened to the bars 140, 141. When the bar 138 is in the lower position (Fig. 2), the projections 169$^a$ are clear of the carrying wheels, but the adding wheels 139 are locked by means of fingers 170$^a$ at that time projecting between two adjoining teeth 139$^a$. All of the said fingers 170$^a$ are carried by a transverse bar 170 secured to arms 171 fulcrumed at 171$^a$. The upper ends of the arms 170 are slotted to receive the bar 138. Thus when the bar 138 is raised, the fingers 170$^a$ will be lowered to clear the path of the pins 139$^a$. The ends of the fingers 170$^a$ are preferably yielding or spring-like, in order to permit the partial (one-tenth) revolution of the adding wheels 139, or in other words so that the pins 139$^a$ on one side of the fingers 170$^a$ may occupy or take the position of the pins on the other side, as best shown in Fig. 2. The wheels 139, during the carrying, may be required to rotate to the extent of one division, but are locked against further movement. The elastic character of the ends of the fingers 170$^a$ allows the wheels to turn one division if required, but no more.

At each operation of the handle 113, the platen 109 is turned so as to obtain the proper line spacing. For this purpose, an upright bar 172 having a pin-and-slot connection at 172$^a$ with one of the arms 151, and sliding in a fixed guide 173, carries and operates a spring-pressed feed pawl 174 engaging a ratchet wheel 109$^b$ on the shaft of the platen.

The following device is provided for feeding the ink ribbon and for reversing it periodically: The link 167 has a pin-and-slot connection at 175$^a$ with a lever 175 fulcrumed at 175$^b$ and having at its upper end a pin-and-slot connection 175$^c$ with an arm 176 mounted to rock on the shaft 177 of one of the ribbon spools 178. Another arm 179, rigid with the arm 176, is pivotally connected at 179$^a$ with a horizontal link 180 the other end of which is pivotally connected at 180$^a$ with an arm 181 mounted to rock on the shaft 182 of the other ribbon spool 183. The spools are provided with the customary teeth 178$^a$, 183$^a$ facing in opposite directions and adapted for engagement with the spring-pressed pawls 184, 185 respectively fulcrumed at 179$^a$, 180$^a$ respectively. Thus, as the link 180 is reciprocated through the action of the lever 175, the pawl 184 or 185 which is in operative position at the time, will turn the respective spool 178 or 183 and feed the ribbon 186 in one direction or the other. The ribbon passes through normally stationary guides 187 which hold it in proper relation to the platen 109, and also passes through additional guides 188, 189 adapted to be engaged by reversing projections (of well-known character) secured to the ends of the ribbon and adapted to press on said movable guides 188, 189, to effect the reversal of the ribbon as follows: Each of the guides 188, 189 is secured rigidly to a lever 190, 191 respectively fulcrumed on a horizontal axis 190$^a$, 191$^a$ respectively. The forward ends of the levers have pins 192, 193 respectively projecting upwardly through a bar 194 in which they are mounted to slide up and down. The weight of the levers normally keeps the pins 192, 193 in the lower position, in which they are out of the path of oppositely beveled projections 180$^b$, 180$^c$ on the lower face of the link 180. When a pin at the one end of the ribbon 186 strikes the guide 188 or 189, the corresponding pin 192 or 193 is lifted into the path of the projection 180$^b$ or 180$^c$, and during the next reciprocation of the link 180 the vertical face of said projection will force said pin 192 or 193 and with it the bar 194 to one side or the other. The ends of the bar 194 are pivotally connected at 194$^a$, 194$^b$ with cams 195, 196 respectively mounted to rock on the spool shafts 177, 182 respectively. These cams engage the pins 184$^a$, 185$^a$ on the pawls 184, 185 respectively, the arrangement of the cams being such as to hold the pawl 184 disengaged when the pawl 185 is engaged, and vice versa. To hold the reversing bar 194 against accidental movement, one of the cams, 195, may be provided with two notches 195$^a$ into which snaps a spring-pressed pawl 197 fulcrumed at 197$^a$.

The platen 109 may be turned by hand when desired, by means of a milled knob 109$^c$. A spring-pressed holder 198, fulcrumed at 198$^a$, carries a paper roller 199 and paper guide fingers 200. When the holder is swung down, the line-spacing pawl 174 is thrown out of engagement with the platen ratchet 109$^b$ by a pin 198$^c$ on the holder 198.

In order to compel the user to give the handle 113 a complete forward throw, until it engages the stop 115, I provide the following mechanism which prevents the return movement of the handle until it has been brought fully forward: On the rock shaft 117 is secured a toothed sector 201 adapted to engage a pawl 202 fulcrumed on the frame at 202$^a$ and pulled (when free) by a spring 203 in such a direction as to stand radially with respect to the sector. That is to say, the center of the shaft 117, the fulcrum 202$^a$, and the fixed end of the spring 203 are in a straight line, see Fig. 3. Normally the sector 201 is not in engagement with the pawl 202. When the shaft 117 is swung forward, the sector 201 comes in engagement with the pawl 202 and swings it on its fulcrum (contra-clockwise in Fig. 3) so that the pawl no longer stands radially, but will prevent a return of the sector 201 and shaft 117. The pawl will of course allow the forward motion of the sector to continue. At the end of this forward motion, the pawl 202 will slip off the rear edge of the sector 201, and the spring 203 will at once restore the pawl to its radial position. The return movement of the shaft 117 is no longer prevented. During such return movement, the sector 201 will again come in engagement with the pawl 202, swinging the latter on its pivot in the opposite direction (clockwise in Fig. 3), so that the return movement of the shaft 117 must be completed before said shaft can be moved forward again.

From the above description it will be clear how the items are "set up," and printed on the paper, also how the total is registered by means of the adding wheels 139. I still have to describe the mechanism for printing the totals and for setting the adding wheels 139 back to zero.

At the left hand side of the machine is located the zero handle 204 carried by a rock shaft 205 provided with a sector 206 in mesh with a pinion 207 secured on the shaft 153. To the sector 206 is secured rigidly a cam 208, which after the sector has had a slight forward movement, is adapted to engage a beveled face at one end of a collar 209 held to turn with the shaft 153 but capable of sliding lengthwise thereof. A spring 210 tends to throw the collar 209 toward the pinion 207. The collar 209 is connected rigidly with a zero-setting bar 211 slidable lengthwise of the shaft 153 in a suitable keyway thereof, so that said bar will always turn with the shaft. On the bar 211 are secured at regular intervals, projections 211$^a$ adapted to engage pins 139$^c$ on the adding wheels 139, each wheel having one of these pins. Normally the pins 139ᶜ and the corresponding projections 211ᵃ are not in the same transverse planes, that is to say, the projections 211ᵃ are not in the path of the pins 139ᶜ. When however the shaft 153 is rotated as described above, the cam 208 will force the collar 209 lengthwise of the shaft 153 against the action of the spring 210, so that the bar 211 will also be moved lengthwise, bringing the projections 211ᵃ into the same planes with the corresponding pins 139ᶜ. As the shaft 153 and the bar 211 rotate together, the projections 211ᵃ will engage and push before them, the pins 139ᶜ of the adding wheels, except those that happen to be in the zero position, "picking up" these pins wherever they happen to stand, so that at the end of the revolution, all the adding wheels 139 will thus have been brought back to the zero position. The projections 211ᵃ are beveled on one side (the rear side, with reference to the direction in which they turn), so that if any wheel 139 is in the zero position when the zero handle 204 is started, the corresponding projection 211ᵃ will slip by the pin 139ᶜ of said wheel and not turn the wheel. It will be observed that the projections 211ᵃ of the zero-setting bar 211 rotate the adding wheels 139 in the opposite direction to that in which they are rotated by the racks 136 during the adding operation. As the adding wheels are being returned to zero in the manner described, the tens pins 139ᵇ will come against the angular faces of the corresponding teeth 155ᵃ of the carrying mechanism, which teeth form stops to prevent the adding wheels from being thrown beyond their proper positions.

In order that the total may be printed, the type bars 106 are operatively connected with the adding wheels 139 at the time the latter are being set to zero. For this purpose, the shaft 205 has a crank arm 206ᵇ pivotally connected at 206ᵃ with a link 212 extending rearwardly and provided with a longitudinal slot 212ᵃ into which extends a pin 143ᵉ of the cam sector 143. Normally (Fig. 2) the pin 143ᵉ is at the rear end of the slot 212ᵃ, so that when the said sector 206 is drawn forward by the operation of the zero handle 204, the cam sector 143 (or rather the sectors 143, since the arrangement is duplicated at each side of the machine) will be carried along, raising the universal bar 138 and the rack bars 136 in the same manner as described in connection with the adding operation. The pin 143ᵇ will move with the sector 143, but inasmuch as said pin is normally at the rear end of the slot 146ᵃ, it will move forward in said slot idly at the time the zero handle is operated, without having any operating effect on the link 146. Thus, when the adding wheels 139 are set to zero by being rotated (backward) by the projections 211ᵃ, these adding wheels will pull the respective rack bars 136 forward or downward to an extent proportionate to their rotation, so that at the end of the movement, the key bars 101 will exhibit, near the upper edge of the plate 112, the same number or total which was exhibited by the adding wheels 139 immediately before the zero-setting operation. Of course, the type bars 106 will be in a corresponding position. If, while still holding the zero handle 204 in the forward position, the main handle 113 is also drawn forward as far as it will go (under the circumstances assumed the main handle can be given only a partial throw, as explained below), the printing mechanism will be operated in the same manner as described above, causing the result or total to be printed on the paper. As it is desirable to print totals in a distinctive color, I use a two-color ribbon, and the ribbon guides 187 are movable vertically to bring one portion of the ribbon or the other into active position. For this purpose, an arm 205ᵃ on the shaft 205 is connected with a link 213 extending rearwardly to an elbow lever 214 fulcrumed at 214ᵃ and arranged to raise a rod 215 the upper end of which is connected with the frame 216 fulcrumed at 216ᵃ and carrying the said ribbon guides 187. Thus the totals may be printed, say in red, and the items in purple.

After the total has been printed as described, the zero handle 204 is allowed to return to its original position under the influence of the spring 145 acting on the sector shaft 144, the universal bar 138 returning to its lower position so that the rack bars 136 are disengaged from the adding wheels 139. Two different operations are now possible: If the adding operation has been completed, that is to say, if the printed total is the final result, the key bars 101 which have been lowered by the zero-setting mechanism, are pushed back by hand to their original upper or rear position, and the main handle 113 is moved fully forward from the intermediate position which it reached when printing the total, and is then released to return to its normal position. This restores all the parts of the machine to the initial or zero position. In some cases, however, the total printed is not the final total, but an intermediate result or "subtotal", that is to say, it is desired to continue adding items to such subtotal. In this case, after the zero handle has returned to its normal position, those key bars 101 which are in the lower or forward position are not returned by hand, but the forward movement of the handle 113 is continued to cause the return of the key bars 101 in the same manner as described in connection with the adding operation, that is to say, the adding wheels 139 are rotated by means of the rack bars 136, during the return of the key bars 101, so that when the handle 113 comes back to its initial position, the key bars 101 and the type bars 106 will be in their original positions, but the adding wheels 139, instead of standing at zero, will show the "subtotal" which has just been printed.

To compel the user to give the zero handle 204 a full throw forward at every operation, I provide the mechanism indicated in Fig. 4, which prevents said handle from returning until it is brought to its extreme forward position: A sector 217, rigidly secured to the shaft 205, is provided with teeth 217$^a$ in engagement with a locking pawl or detent 218 journaled at 218$^a$ and held in one or the other of its operative positions by a spring detent 219. The pawl 218 has two teeth 218$^b$; the forward one is in engagement when the parts are in their original position (Fig. 4), said tooth then standing at such an angle to a radial line of the sector 217 as to allow the latter to move forward freely, the said tooth 218$^b$ slipping over the teeth 217$^a$ of the sector 217. When the sector 217 reaches its extreme forward position, a projection 217$^b$ at the rear end of the sector engages the locking pawl 218 and reverses it, bringing the other tooth 218$^b$ of said pawl into engagement with the teeth 217$^a$ of the sector 217. This tooth can now slip over the teeth of the sector during the return or rearward rocking movement of the zero handle 204 and of said sector 217. At the end of this return movement, the pawl 218 will be reversed again by the action of a projection 217$^c$ at the forward end of the sector 217. With this arrangement, therefore, the zero handle 204 cannot be thrown forward unless it is in the extreme rearward position, neither can it move rearward unless it is in the extreme forward position, the teeth 217$^a$ of the sector 217 and those of the locking pawl 218 co-operating as described to produce this result.

It is very important to prevent the zero and total setting mechanism from being operated while one or more of the key bars 101 and of the type bars 106 are out of the zero position. In other words, the zero and total setting device should be operated only with all the key bars 101 in their normal or rear position. For this purpose, each of the levers 105 is provided, adjacent to its fulcrum, with a forwardly facing cam or heel 105$^d$, and whenever a key bar 101 is moved down (forward), the corresponding heel or cam 105$^d$ will push forward on a rod 220 extending across the levers 105 and carried by two arms 221 fulcrumed on the frame at 221$^a$. One of the arms 221 carries a stop 222 which by the operation just described is brought over an arm 223 secured to the zero handle shaft 205, so as to lock said shaft against forward rotation. In order that the stop 222 may yield during the return of the zero handle, said stop is pivoted to the arm 221 at 222$^a$, and is normally kept against said arm by a spring 224, the rear end of which is attached to the frame of the machine. In Fig. 2, the rear portion of the spring 224 has been broken away for the sake of clearness. This spring also performs the function of pulling the arms 221 rearward to keep the rod 220 against the cam heels 105$^d$.

When the zero handle 204 is thrown fully forward, an arm 225 secured rigidly to the shaft 205 moves upward into the path of the link 146 nearest to the zero handle. Thus if the main handle 113 is operated while the zero handle is fully forward, only a partial movement can be given to the main handle, this movement being arrested as soon as the forward end of the link 146 comes in engagement with the raised stop arm 225. The movement of the main handle under these conditions is sufficient to operate the printing mechanism, but not to operate the rack bars 136 and bring the type bars 106 and key bars 101 back to their normal positions.

Various modifications may be made without departing from the nature of my invention as set forth in the appended claims.

I claim as my invention:

1. In an adding and recording machine, the combination with a movable type bar of means to move said type bar to bring a type thereon into printing position, said means including an operating bar having free lengthwise movement in opposite directions to unchecked positions of rest.

2. In an adding and recording machine, the combination with a movable type bar of means to move said type bar to bring a type thereon into printing position said means including a key bar movable freely in opposite directions to unchecked positions of rest.

3. In an adding and recording machine, the combination with a movable type bar bearing a series of numeral types, of means to move said type bar to bring a type thereon into printing position, said means including a key bar bearing a corresponding series of numeral indications and movable freely in opposite directions to unchecked positions of rest.

4. In an adding and recording machine, the combination with type bars capable of independent movement, of means for variably moving said type bars to bring types thereon into printing position, said means including key bars movable freely in opposite directions to unchecked positions of rest.

5. In an adding and recording machine, the combination with type bars each bearing a series of numeral types and capable of independent movement, of means for variably moving said type bars to bring types thereon into printing position, said means including key bars each bearing a corresponding series of numeral indications and movable freely in opposite directions to unchecked positions of rest.

6. In an adding and recording machine, the combination with type bars each capable of independent movement, of means for variably moving said type bars to bring types thereon into printing position, said means including key bars movable freely in opposite directions, said key bars with the type bars they control being settable in unfixed positions of rest from which they are freely adjustable.

7. In an adding and recording machine, the combination with type bars capable of independent movement, of means for variably moving said type bars to bring types thereon into printing position, said means including key bars movable freely in opposite directions to unchecked positions of rest, and bearing numeral containing divisions representing movement indications of variable extent.

8. In an adding and recording machine, the combination with type bars each capable of independent movement, of means for variably moving said type bars to unrestrained positions of rest to bring types thereon into the vicinity of the printing line, said means including bars movable freely in opposite directions.

9. In an adding and recording machine, the combination with type bars each capable of independent movement, of means for variably moving said type bars to unrestrained positions of rest to bring types thereon into the vicinity of the printing line, said means including key bars movable freely in opposite directions.

10. In an adding and recording machine, the combination with type bars each capable of independent movement, of means for variably moving said type bars to unfixed positions to bring types thereon into the vicinity of the printing line, said means including key bars each movable freely to variable extents in opposite directions to unrestrained positions of rest, and means operative within a space representing the distance separating adjacent types on said type bars to gather and aline them.

11. In an adding and recording machine, the combination of a series of parallel type bars mounted to slide and also capable of moving transversely, a platen adapted to support paper adjacent to said type bars, means for shifting the several type bars lengthwise individually to bring the desired types to the printing point, a shutter movable in front of said type bars and arranged to be arrested by a type bar that has been moved out of its normal position, and a hammer arranged to exert a blow on said shutter on the side opposite to the type bars, to throw those type bars which are engaged by the shutter, toward the platen.

12. In an adding and recording machine, the combination of a series of parallel type bars mounted to slide up and down and also movable transversely, a platen adapted to support paper adjacent to said type bars, means for shifting the individual type bars lengthwise to bring the desired types to the printing point, a shutter movable on the side of the type bars opposite to the platen and provided with a projection the path of which lies above the upper ends of the type bars when the latter are in their normal position, said projection being adapted to be arrested by a type bar which has been raised from its normal position, and a hammer arranged to exert a blow against the side of said shutter opposite to the type bars, to throw those type bars which are in engagement with the shutter, toward the platen.

13. In an adding and recording machine, the combination of a series of parallel type bars mounted to slide lengthwise and also movable transversely, a platen adapted to support paper adjacent to said type bars, means for shifting the individual type bars lengthwise so as to bring the desired types into the printing position, a shutter arranged on the side of the type bars opposite to the platen and mounted to swing about an axis perpendicular to the plane in which the type bars are arranged and move, said shutter being adapted to be arrested by a type bar that has been moved out of its normal position, and a hammer mounted to swing about an axis perpendicular to that of the shutter and adapted to exert a blow against the side of said shutter opposite to the type bars, to throw those type bars which are in engagement with the shutter, toward the platen.

14. In an adding and recording machine, the combination of type bars each bearing a plurality of types and each movable lengthwise to bring different types to the printing position, a platen adapted to support paper adjacent to said type bars, means for shifting the individual type bars to bring the desired types to the printing position, a shutter pivoted to swing in front of the type bars, a spring for drawing the shutter to one side, a stop opposing the movement of the shutter in response to the action of said spring, means for operating said stop to allow the shutter to follow the pressure of the spring, means for arresting the shutter before it swings clear of all the type bars, and a hammer arranged to exert a blow on the shutter on the side opposite to the type bars, to throw those type bars which are engaged by the shutter, toward the platen.

15. In an adding and recording machine, the combination of a series of type bars mounted to slide for bringing any one of their several types into the printing position, a platen adapted to support paper adjacent to said type bars, means for shifting the individual type bars to bring the desired types to the printing position, a shutter movable in front of the type bars, a fixed stop for limiting the movement of the shutter before it clears all the type bars, and means for exerting a blow on the side of the shutter opposite to the type bars, to throw those which are in engagement with the shutter, toward the platen.

16. In an adding and recording machine, the combination of a series of type bars each bearing a plurality of types and slidable to bring different types to the printing position, a platen adapted to support paper adjacent to said type bars, means for moving the type bars lengthwise individually, a shutter movable in front of the type bars and provided with a finger arranged to clear the type bars when the latter are in their normal position, but to be arrested by a type bar which is out of its normal position, a fixed stop arranged in the path of said finger and adapted to arrest the shutter before it clears all the type bars, and a device for delivering a blow against the side of the shutter opposite to the type bars, to throw those which are in engagement with the shutter, toward the platen.

17. In an adding machine, the combination of key bars and rack bars connected therewith, adding wheels normally out of engagement with said racks, carrying mechanism in conjunction with said wheels, means for bringing the racks into and out of engagement with the adding wheels, a lock for the adding wheels, another lock for the carrying mechanism, and means whereby the lock for the carrying wheels is thrown in when the racks are brought into engagement with the adding wheels, and whereby at the same time the lock for the adding wheels is thrown out, while the last-named lock is thrown in, and the lock for the carrying mechanism thrown out, when the racks are brought out of engagement with the adding wheels.

18. In an adding machine, the combination of movable key bars, rack bars connected therewith, adding wheels adapted to be engaged by said rack bars, a universal bar in sliding engagement with all of the rack bars, a rocking sector having a cam with an inclined face to move the universal bar toward the adding wheels when the sector rocks in one direction and with a peripheral face to keep the universal bar in such position as the sector continues to rock in the same direction, the sector further having a pawl whose end normally lies adjacent to the inclined face of the cam and whose side is adapted to support the universal bar as the sector rocks in the opposite direction, to keep the said bar in a position in which it causes the rack bars to be disengaged from the adding wheels, and means for operating said sector.

19. In an adding machine, the combination of movable key bars, rack bars connected therewith, adding wheels adapted to be engaged by said rack bars, a universal bar in sliding engagement with all of the rack bars and movable up and down to bring the rack bars into and out of engagement with the adding wheels, a rocking sector having a cam with an inclined end, a spring-pressed pawl having an inclined end normally engaging said cam and lying in the continuation thereof, a stop carried by said sector at the end of the cam opposite to that which is engaged by said pawl, another pawl located adjacent to said stop, the said cam and pawls with the stop forming guiding means to cause the universal bar to be raised during the rocking of the sector in one direction and to be lowered only during the return movement of the said sector.

20. In an adding mechanism, the combination of adding wheels, means for turning them, carrying wheels adapted to coöperate with the adding wheels, mechanism for establishing and discontinuing the connection of the adding wheels with the means for turning them, and locking projections, movable in unison with the last-named mechanism, and adapted to be brought into the path of the carrying wheels when the adding wheels are connected with the means for turning them.

21. In an adding mechanism, the combination of movable key bars, rack bars connected therewith, adding wheels adapted to be engaged by said rack bars, carrying wheels arranged to coöperate with said adding wheels, a device for bringing the rack bars into and out of engagement with the adding wheels, and two sets of locking projections, movable in unison with said device, one set of projections being adapted to be brought into the path of the adding wheels when the rack bars are brought out of engagement with said wheels, while the other projections are adapted to be brought into the path of the carrying wheels when the rack bars are brought into engagement with the adding wheels.

22. In an adding and recording machine, the combination of key bars, type bars connected therewith, adding wheels adapted to coöperate with said key bars, printing mechanism operating in conjunction with said type bars, a handle for operating said printing mechanism and thereupon moving the key bars to turn the adding wheels, a zero handle for returning the adding wheels to zero and at the same time bringing the type bars into a total-printing position, and means, operated by the movement of the zero handle, for arresting the first-named handle after it has reached the printing position and before it can operate on the key bars.

23. In an adding and recording machine, the combination of key bars, type bars connected therewith, adding wheels normally disconnected from the key bars so that the latter may be moved freely without operating the adding wheels, a main handle, printing mechanism operating in conjunction with said type bars and actuated by the initial movement of said main handle, means operated by the continued movement of said handle, for moving the adding wheels in unison with the key bars, a zero handle for returning the adding wheels to zero and bringing the type bars into a total-printing position, and locking means, operated by the movement of the zero handle, for arresting the main handle after it has reached the printing position and before it can operate on the key bars and adding wheels.

In testimony whereof, I have hereunto signed my name in the presence of two subscribing witnesses.

LEE S. BURRIDGE.

Witnesses:
FRANK O. BURRIDGE,
CHARLES W. HOWELL, Jr.

Copies of this patent may be obtained for five cents each, by addressing the "Commissioner of Patents. Washington. D. C."